United States Patent [19]
Harness et al.

[11] Patent Number: 5,479,647
[45] Date of Patent: Dec. 26, 1995

[54] CLOCK GENERATION AND DISTRIBUTION SYSTEM FOR A MEMORY CONTROLLER WITH A CPU INTERFACE FOR SYNCHRONIZING THE CPU INTERFACE WITH A MICROPROCESSOR EXTERNAL TO THE MEMORY CONTROLLER

[75] Inventors: Jeffrey F. Harness; Ali S. Oztaskin, both of Hillsboro, Oreg.

[73] Assignee: Intel Corporation, Santa Clara, Calif.

[21] Appl. No.: 151,503

[22] Filed: Nov. 12, 1993

[51] Int. Cl.$^6$ .................................................. G06F 13/42
[52] U.S. Cl. .................. 395/550; 364/DIG. 1; 364/271.1; 364/271.5; 364/238.4
[58] Field of Search .................................. 395/550, 425, 395/725

[56] References Cited

U.S. PATENT DOCUMENTS 5,276,858  1/1994  Oak et al. .............................. 395/550

OTHER PUBLICATIONS

"82369 DRAM Controller," Intel Peripheral Components, pp. 1-522 through 1-700 (1993).

*Primary Examiner*—Thomas M. Heckler
*Attorney, Agent, or Firm*—Blakely, Sokoloff, Taylor & Zafman

[57] ABSTRACT

A clock generation and distribution system for a memory controller in a computer system is described. The memory controller includes a CPU interface circuit-that interfaces with a microprocessor, a bus controller interface circuit that interfaces with a bus controller, and a main memory controller circuit coupled to a memory for controlling memory operations of the memory. The clock generation and distribution system includes a clock generation circuit for generating a first clock signal in accordance with an input clock signal. A delay circuit delays the first clock signal to be a delayed first clock signal. The delay circuit has a controllable delay. An electrical connection circuit external to the memory controller transfers the delayed first clock signal to the (1) the microprocessor, (2) the bus controller, (3) the CPU interface circuit, and (4) the bus controller interface circuit such that the CPU interface circuit is synchronized with the microprocessor and the bus controller interface circuit is synchronized with the bus controller by the delayed first clock signal. The electrical connection circuit generates a signal transfer delay to the delayed first clock signal. The delay circuit controls the controllable delay such that the delayed first clock signal with the signal transfer delay is also synchronized with the input clock signal.

13 Claims, 4 Drawing Sheets

CLOCK GENERATION AND DISTRIBUTION SYSTEM FOR A MEMORY CONTROLLER WITH A CPU INTERFACE FOR SYNCHRONIZING THE CPU INTERFACE WITH A MICROPROCESSOR EXTERNAL TO THE MEMORY CONTROLLER

FIELD OF THE INVENTION

The present invention pertains to the field of computer systems. More particularly, this invention relates to dynamic random access memory (DRAM) controllers that operates with minimized DRAM access latency in a computer system.

BACKGROUND OF THE INVENTION

In a prior microprocessor based system having memory, a microprocessor, as well as other circuitry, it is necessary to have clock or timing signals for various uses. For instance, when a microprocessor accesses a DRAM (i.e., dynamic random access memory) in the system, many clock signals are required from the microprocessor to latch addresses, decode the addresses, access the memory array, precharge nodes, control refreshing, etc.

The advances in the microprocessor technologies have led to the creation of high speed and high performance microprocessors. However, interfacing such a high speed, high performance microprocessor to a DRAM array requires the microprocessor to analyze many timings, to examine refresh cycle effects on bus timing, and to note minimum and maximum signal widths, which adversely affects the speed and performance of the microprocessor.

One prior solution to these problems is to design a DRAM controller that interfaces with the microprocessor and the DRAM device. A prior DRAM controller typically provides complete control and timing for the DRAM device. The microprocessor interfaces with the DRAM controller. Other system bus masters may also interface with the DRAM controller. The DRAM controller decodes CPU to DRAM access commands, translates the microprocessor address to the proper multiplied DRAM row and column address, and generates the proper DRAM control timing signals required to successfully complete the DRAM access cycle.

The DRAM controller typically operates at the same frequency as that of the microprocessor and other system bus masters. This is due to the fact that the DRAM controller typically receives the same clock signal as that of the microprocessor and the system bus masters. FIG. 1 illustrates a typically prior art clock supply arrangement for a computer system having the DRAM controller.

As can be seen from FIG. 1, computer system 5 includes a clock source 6 that generates a clock signal CLK. The clock signal CLK is supplied to each of a DRAM controller 7, a CPU 8, and a bus controller 9 of computer system 5. In other words, DRAM controller 7, CPU 8, bus controller 9 all receive the same clock signal CLK from clock source 6.

One disadvantage of this scheme is the DRAM access latency. Due to typical DRAM AC parameters, certain DRAM access latencies (i.e., delays) are incurred in the DRAM controller upon completion of a DRAM access cycle. Typically, cycle decoding, address translation, and control signal generation all generate delays. The delays are typically measured as wait states at the microprocessor (i.e., CPU) or the bus controller, which affect the speed and performance of the microprocessor and the bus controller.

Another disadvantage of the scheme is that the DRAM controller is typically unable to operate synchronously with the microprocessor and other system masters at the clock signal CLK. This is due to the fact that different delays may be incurred to the clock signal CLK supplied to each of the DRAM controller, the microprocessor, and the bus controller. Typically, the DRAM controller has a CPU interface circuit that interfaces with the external microprocessor and a bus controller interface circuit that interfaces with the external bus controller. The DRAM controller includes a clock generation circuit that receives the CLK clock signal and supplies the clock signal to the interface circuits of the DRAM controller.

Due to wafer processing variations, power supply variations, operation temperature variations, and other variations, substantial variations exist in the delays of the clock signal CLK occurred in the DRAM controller, in the microprocessor, and in the bus controller. In this case, the clock signal CLK received in the CPU interface circuit of the DRAM controller has a substantially different delay than that in the microprocessor. This typically causes the two circuits not to operate synchronously with each other. In this case, the microprocessor has to wait in order to follow the operation of the DRAM controller, or vice versa.

Typically, all the input signals to the DRAM controller are made to synchronize with the clock signal CLK received at the DRAM controller. This is typically done by having the DRAM controller wait for a couple of clock cycles before it responds to the input signals. Because the signal delay generated by the DRAM controller is different from that generated by the microprocessor or bus controller, it is typically difficult to synchronize the DRAM controller with the external microprocessor and bus controller.

SUMMARY AND OBJECTS OF THE INVENTION

One of the objects of the present invention is to increase the system performance of a computer system.

Another object of the present invention is to reduce the system cost of a computer system.

Another object of the present invention is to increase the system performance of the computer system without increasing the system cost.

Another object of the present invention is to reduce the system cost of the computer system without decreasing the system performance of the computer system.

A clock generation and distribution system for a memory controller in a computer system is described. The computer system includes a microprocessor and a bus controller coupled to the memory controller. The memory controller includes a CPU interface circuit that interfaces with the microprocessor, a bus controller interface circuit that interfaces with the bus controller, and a main memory controller circuit coupled to a memory for controlling memory operations of the memory. The clock generation and distribution system includes a clock generation circuit coupled to receive an input clock signal from an external clock source for generating a first clock signal in accordance with the input clock signal. The first clock signal is applied to the main memory controller circuit. A delay circuit is coupled to the clock generation circuit for delaying the first clock signal to be a delayed first clock signal. The delay circuit has a controllable delay. An electrical connection circuit external to the memory controller is coupled to the delay circuit for transferring the delayed first clock signal to the (1) the microprocessor, (2) the bus controller, (3) the CPU interface circuit, and (4) the bus controller interface circuit such that the CPU interface circuit is synchronized with the microprocessor and the bus controller interface circuit is synchronized with the bus controller by the delayed first clock signal. The electrical connection circuit generates a signal transfer delay to the delayed first clock signal. The delay circuit controls the controllable delay such that the delayed first clock signal with the signal transfer delay is synchronized with the input clock signal.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
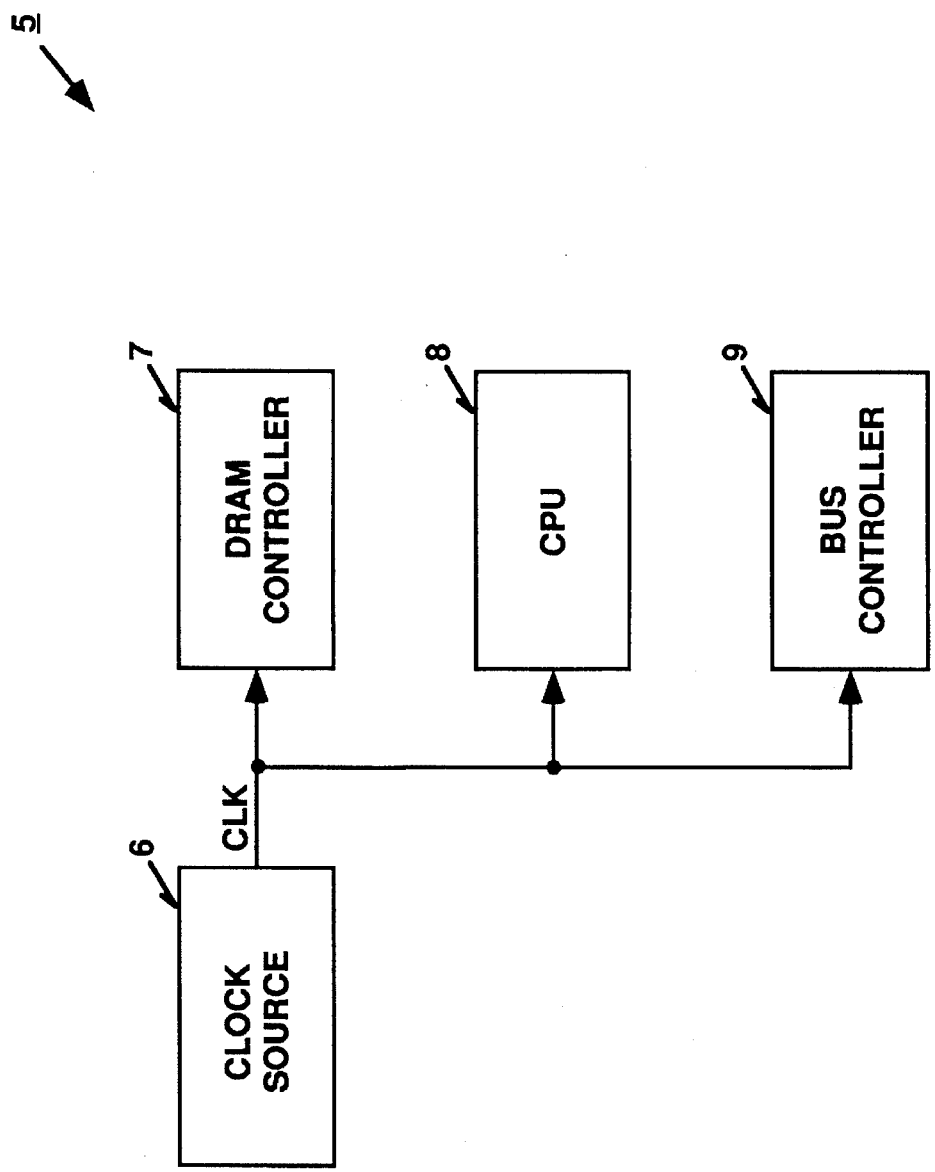
FIG. 1 is a block diagram of a computer system with a prior art clock supply arrangement.
Figure 2:
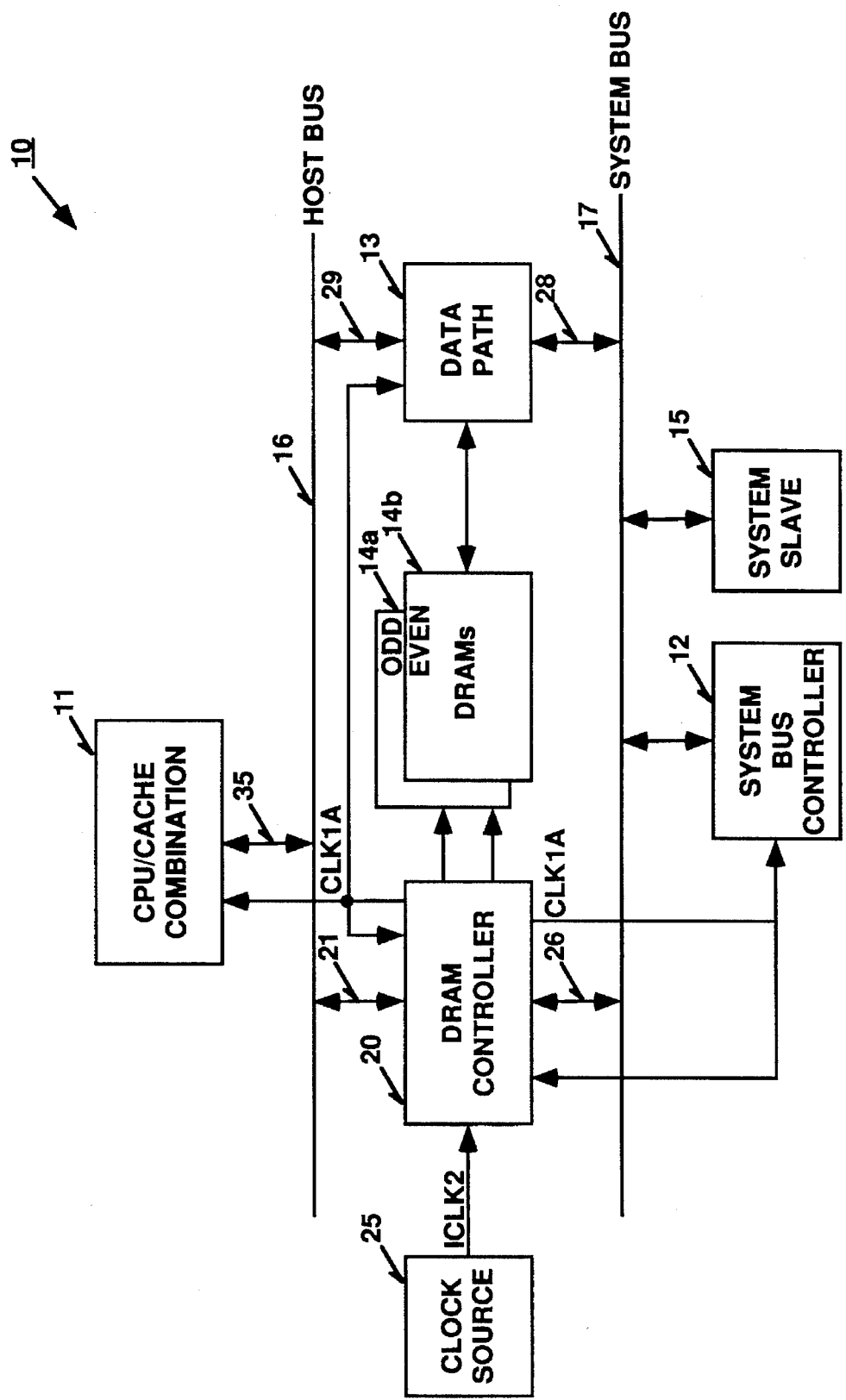
FIG. 2 is a block diagram of a computer system with a clock supply arrangement in accordance with one embodiment of the present invention.

FIG. 2 illustrates an architecture of a microprocessor based computer system 10, which implements an embodiment of the present invention. FIG. 2 illustrates one configuration of computer system 10.

Referring to FIG. 2, computer system 10 includes a host bus 16 connected to a central processing unit ("CPU") 11. CPU 11 typically comprises a microprocessor and a cache connected to the microprocessor. In one embodiment, CPU 11 includes a microprocessor, a co-processor, a cache, and a cache controller for handling access to the cache by the microprocessor. In a further embodiment, the elements mentioned above may reside on a single semiconductor substrate. In other embodiments, more or fewer than the elements mentioned above may be included in CPU 11.

Computer system 10 also includes DRAMs 14a and 14b and a DRAM controller 20. DRAMs 14a–14b are DRAM arrays and DRAM 14a represents the odd DRAM array and DRAM 14b represents the even DRAM array. In alternative embodiments, DRAMs 14a and 14b may be replaced with other types of volatile memories and DRAM controller 20 may be replaced with other types of memory controllers. In alternative embodiments, DRAMs 14a–14 b may have more or fewer than two memory arrays.

DRAM controller 20 controls access to DRAMs 14a–14b. CPU 11 therefore can access DRAMs 14a–14b via host bus 16 and via DRAM controller 20. The data read from DRAMs 14a–14b can be forwarded to CPU 11 via a data path 13 and host bus 16. In one embodiment, DRAM controller 20 is a dual port memory controller, which will be described in more detail below.

Computer system 10 also includes a system bus 17 and a system bus controller 12. System bus controller 12 is coupled to system bus 17 to control the activities on system bus 17. System bus controller 12 also controls the system access to DRAMs 14a–14b via DRAM controller 20. System bus controller 12 is a system master. In alternative embodiments, system bus 17 may be connected to more than one system master.

System bus 17 is also connected to a system slave 15. A system slave only accepts cycles from various masters. A system master can generate memory or I/O cycles. In alternative embodiments, system bus 17 may be connected to more than one system slave. FIG. 2 only illustrates one system master and one system slave for illustration purposes. In practice, many more system masters and slaves can be connected to system bus 17.

System bus controller 12 controls the system devices (i.e., system masters and slaves) connected to system bus 17 to access DRAMs 14a–14b via DRAM controller 20. System bus controller 12 also acts as gateway for CPU 11 to access system slave 15 connected to system bus 17 via DRAM controller 20.

As described above, DRAM controller 20 is a dual port memory controller. DRAM controller 20 includes two ports (i.e., address gateways). One port is connected to CPU 11 via host bus 16. This port (hereinafter referred to as "host port") provides a path for CPU 11 to DRAMs 14a–14b and to system bus 17 via system bus controller 12.

The other port of DRAM controller 20 is connected to system bus controller 12 via system bus 17. This port (hereinafter referred to as "system port") is exclusively used by the system devices coupled to system bus 17. This port of DRAM controller 20 acts as the gateway to and from system bus 17.

The host port of DRAM controller 20 is capable of accepting a host address and host cycle definition at one time. From the address and cycle definition, DRAM controller 20 determines if the cycle is bound for DRAMs 14a–14b or for the system devices coupled to system bus 17. If the cycle is bound for DRAMs 14a–14b, DRAM controller 20 executes a DRAM access cycle. If the cycle is not bound for DRAMs 14a–14b, DRAM controller 20 forwards the cycle to system bus controller 12.

The system port of DRAM controller 20 is capable of sending as well as receiving address and system bus cycle definitions. The system port accepts system bus cycles and decides if the system cycle is for DRAMs 14a–14b or not. If the system cycle includes an address for a memory location in DRAMs 14a–14b, DRAM controller 20 executes a DRAM cycle. When DRAM controller 20 receives addresses and cycle definitions from host bus 16 and system bus 17 at the same time, DRAM controller 20 arbitrates among the requests and executes the winner of the arbitration.

The dual port architecture of DRAM controller 20 allows the CPU activities to be isolated from the system bus activities. This allows CPU 11 to execute out of DRAMs 14a–14b at the same time the system bus activity is occurring. This reduces CPU access time to DRAMs 14a–14b significantly. When CPU 11 decides to access system slave 15, CPU 11 generates a host-to-system cycle in which control signals and addresses are sent to DRAM controller 20. DRAM controller 20 executes the cycle by passing the signals and the addresses to system bus controller 12. System bus controller 12 then converts the signals into its system protocol.

DRAMs 14a–14b are coupled to data path 13. Data path 13 is also connected to host bus 16 via bus 29 and to system bus 17 via bus 28. Data path 13 is used to transfer data read from DRAMs 14a–14b to one of buses 16–17, and to transfer data written into DRAMs 14a–14b from either bus 16 or bus 17. In one embodiment, data path 13 is implemented by a plurality of buffers. Data path 13 is controlled by DRAM controller 20, CPU 11, and system bus controller 12.

Computer system 10 also includes a clock source 25. Clock source 25 generates a clock signal ICLK2. The ICLK2 clock signal is supplied to DRAM controller 20. Based on the ICLK2 clock signal, DRAM controller 20 generates a CLK1A clock signal that is applied to CPU 11, system bus controller 12, and data path 13. In addition, the CLK1A clock signal is also fed back to DRAM controller 20.

CPU 11, system bus controller 12, data path 13, and DRAM controller 20 all operate synchronously with respect to the CLK1A clock signal. In one embodiment, the frequency of the CLK1A clock signal is at approximately 20 MHz. In alternative embodiments, the frequency of the CLK1A signal can be higher or lower than 20 MHz. For example, the frequency of the CLK1A signal can be at 25 MHz or 33 MHz.

In one embodiment, the frequency of the ICLK2 clock signal is twice as that of the CLK1A clock signal. In alternative embodiments, the frequency of the ICLK2 clock signal can be more than two times of that of the CLK1A clock signal.

With the clock signal generation and distribution network shown in FIG. 2, the clock skews incurred to the CLK1A clock signal in each of CPU 11, system bus controller 12, and DRAM controller 20 are substantially minimized and equal to each other. As is known, the clock skews are the electromagnetic propagation delays, the buffer delays, and the RC delays on the clock signal transmission lines. In addition, process variations, temperature variations, power supply variations, and different loading capacitances all contribute to the clock skews.

By supplying the CLK1A clock signal and the DRAM access strobe signals (e.g., the $\overline{CAS}$ signals) from the same component (i.e., DRAM controller 20), the clock skews of the signals track the process, temperature, and power supply voltage variations. By feeding the CLK1A signal back to DRAM controller 20, the clock skews of the CLK1A clock signal fed back to DRAM controller 20 track that of the CLK1A clock signal applied to CPU 11 and bus controller 12. This causes DRAM controller 20 to operate synchronously with CPU 11 and bus master 12, thus reducing the wait states during memory access of CPU 11 or bus controller 12.

In addition, by generating the CLK1A clock signal from DRAM controller 20 and then supplying the CLK1A clock signal to CPU 11 and bus controller 12, some circuits of DRAM controller 20 operate slightly in advance of CPU 11 and bus controller 12 with respect to the timing. The circuitry of DRAM 20 that generates the CLK1A clock signal and the circuitry of DRAM controller 20 that receives the feedback CLK1A signal are described in more detail below, in conjunction with FIGS. 3–4.

Figure 3:
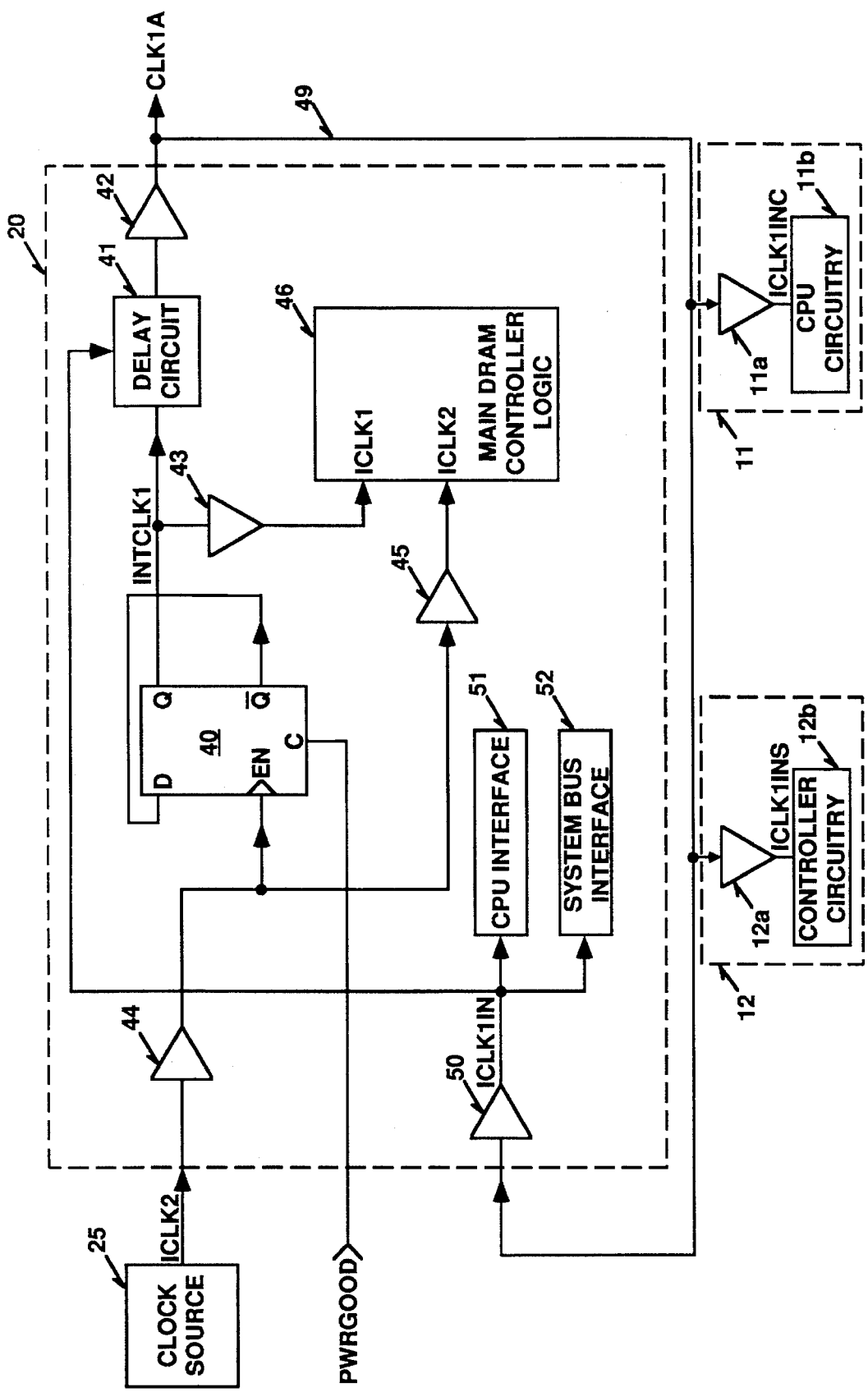
FIG. 3 illustrates in more detail the clock supply arrangement of FIG. 2.

Referring to FIG. 3, DRAM controller 20 includes a main DRAM controller logic 46, a CPU interface 51, and a system bus interface 52. Main DRAM controller logic 46 is coupled to DRAMs 14a–14b of FIG. 2 and generates all the appropriate DRAM access control signals (e.g., the $\overline{CAS}$, $\overline{RAS}$ and $\overline{MDS}$ signals) to access DRAMs 14a–14b during memory access of DRAMs 14a–14b.

CPU interface 51 interfaces with CPU 11. CPU interface 51 is the gateway for CPU cycles to access DRAMs 14a–14b or the system devices coupled to system bus 17. CPU interface 51 receives host addresses with the status signals defining the type of the CPU cycle from CPU 11 via host bus 16. DRAM controller 20 monitors via CPU interface 51 the status signals to determine the type and destination of the CPU cycle.

System bus interface 52 interfaces with system bus controller 12 via system bus 17. System bus interface 52 is responsible for communication between DRAM controller 20 and system bus controller 12. System bus interface 52 receives system addresses and system cycle definitions from system bus controller 12 via system bus 17. Main DRAM controller logic 46 monitors the definition signals to determine the type and destination of the system bus cycle.

As can be seen from FIG. 3, CPU interface 51 and system bus interface 52 both receives an ICLK1IN clock signal from a buffer 50. Buffer 50 receives the CLK1A signal from a clock signal transmission bus 49. Therefore, the ICLK1IN clock signal is the buffered signal of the CLK1A clock signal. The clock signal transmission bus 49 is external to DRAM controller 20 and is coupled to DRAM controller 20 for receiving the CLK1A clock signal. As can be seen in FIG. 3, the CLK1A signal is also supplied to CPU 11 and system bus controller 12 via clock signal transmission bus 49.

By feeding the CLK1A clock signal back to CPU interface 51 and system bus interface 52 via clock signal transmission bus 49, the clock skews (i.e., the signal delays) of the CLK1A clock signal are controlled and equalized such that CPU interface 51 and system bus interface 52 receive the CLK1A clock signal at the same time CPU 11 and system bus controller 12 receive the CLK1A signal.

Each of CPU 11 and system bus controller 12 includes a buffer that receives the CLK1A signal from transmission bus 49 and buffers the CLK1A clock signal to the main circuitry of each of CPU 11 and system bus controller 12. As shown in FIG. 3, CPU 11 includes a buffer 11a and CPU circuitry 11b. Buffer 11a receives the CLK1A clock signal via transmission bus 49. Bus controller 12 includes a buffer 12a and controller circuitry 12b. Buffer 12a receives the CLK1A clock signal via transmission bus 49. Buffers 11a and 12a introduce the same amount of signal delay to the CLK1A clock signal received as that of buffer 50. In addition, the length of transmission bus 49 that transmits the CLK1A clock signal to buffer 50 is equal to that of transmission bus 49 that carries the CLK1A clock signal to buffer 11a of CPU 11 and buffer 12a of system bus controller 12. This equalizes the signal delay introduced to the CLK1A by transmission bus 49 to each of CPU interface 51, system bus interface 52, CPU 11, and system bus controller 12. Because the buffer delay of buffers 11a and 12a of CPU 11 and system bus controller 12 is made the same as that of buffer 50, the ICLK1IN clock signal from the output of buffer 50 will have the same amount of clock skew as that of the ICLK1NC clock signal from the output of buffer 11a and the ICLK1INS clock signal from the output of buffer 12a. By doing this, CPU interface 51 operates synchronously with CPU 11 at the CLK1A clock signal and system bus interface 52 operates synchronously with system bus controller 12 at the CLK1A clock signal.

Because CPU interface 51 operates synchronously with CPU 11, CPU interface 51 introduces little delay to the signals and addresses received from CPU 11. Likewise, because system bus interface 52 operates synchronously with system bus controller 12, system bus interface 52 introduces little delay to the signal and addresses received from system bus controller 12. In this way, the wait states due to the various clock skews of the clock signal can be minimized.

The CLK1A clock signal is supplied to transmission bus 49 by an output buffer 42 of DRAM controller 42. Output buffer 42 is coupled to delay circuit 41 at its input. Delay circuit 41 receives an INTCLK1 signal from a D flip flop circuit 40. D flip flop circuit 40 is triggered by the ICLK2 clock signal from clock source 25 external to DRAM controller 20 via an input buffer 44. The ICLK2 clock signal is also supplied to main DRAM controller logic 46 via input buffers 44 and 45.

Delay circuit 41 provides a controllable delay to the INTCLK1 clock signal applied such that the ICLK1IN signal (as well as the ICLK1INC and ICLK1INS signals) is synchronized with the INTCLK1 signal. As shown in FIG. 3, the ICLK1IN signal is fed back to delay circuit 41 in order to control the controllable delay introduced to the INTCLK1 signal in delay circuit 41. In one embodiment, delay circuit 41 is a phase locked loop circuit. In alternative embodiments, delay circuit 41 can be other type of delay circuit with controllable delay.

D flip flop circuit 40 generates the INTCLK1 signal. In essence, D flip flop circuit 40 is a frequency divider that divides the frequency of the ICLK2 signal. Therefore, the INTCLK1 signal is the divided signal of the ICLK2 clock signal. When the ICLK2 clock signal has a frequency of 40 MHz, the frequency of the INTCLK1 signal is 20 MHz. D flip flop circuit 40 receives a PWRGOOD signal at its C input. The PWRGOOD signal is a power synchronization signal that synchronizes the operation of D flip flop circuit 40 with the power supply of computer system 10 of FIG. 2.

The INTCLK1 signal is also applied to main DRAM controller logic 46 via a buffer 43. The ICLK1 signal is the buffered INTCLK1 signal at main DRAM controller logic 46. Main DRAM controller logic 46 includes a logic (not shown) that synchronizes the ICLK1 signal with the ICLK2 signal such that main DRAM controller logic 46 operates in advance of CPU interface 51 and system bus interface 52. This causes the memory access control signals (e.g., the $\overline{CAS}$,$\overline{RAS}$ and $\overline{MDS}$ signals) generated by main DRAM controller logic 46 to bear minimized delay with respect to the CLK1A signal such that the system performance of computer system 10 of FIG. 2 with respect to the memory access of DRAMs 14a–14b can be enhanced and the wait states in the system are minimized.

Figure 4:
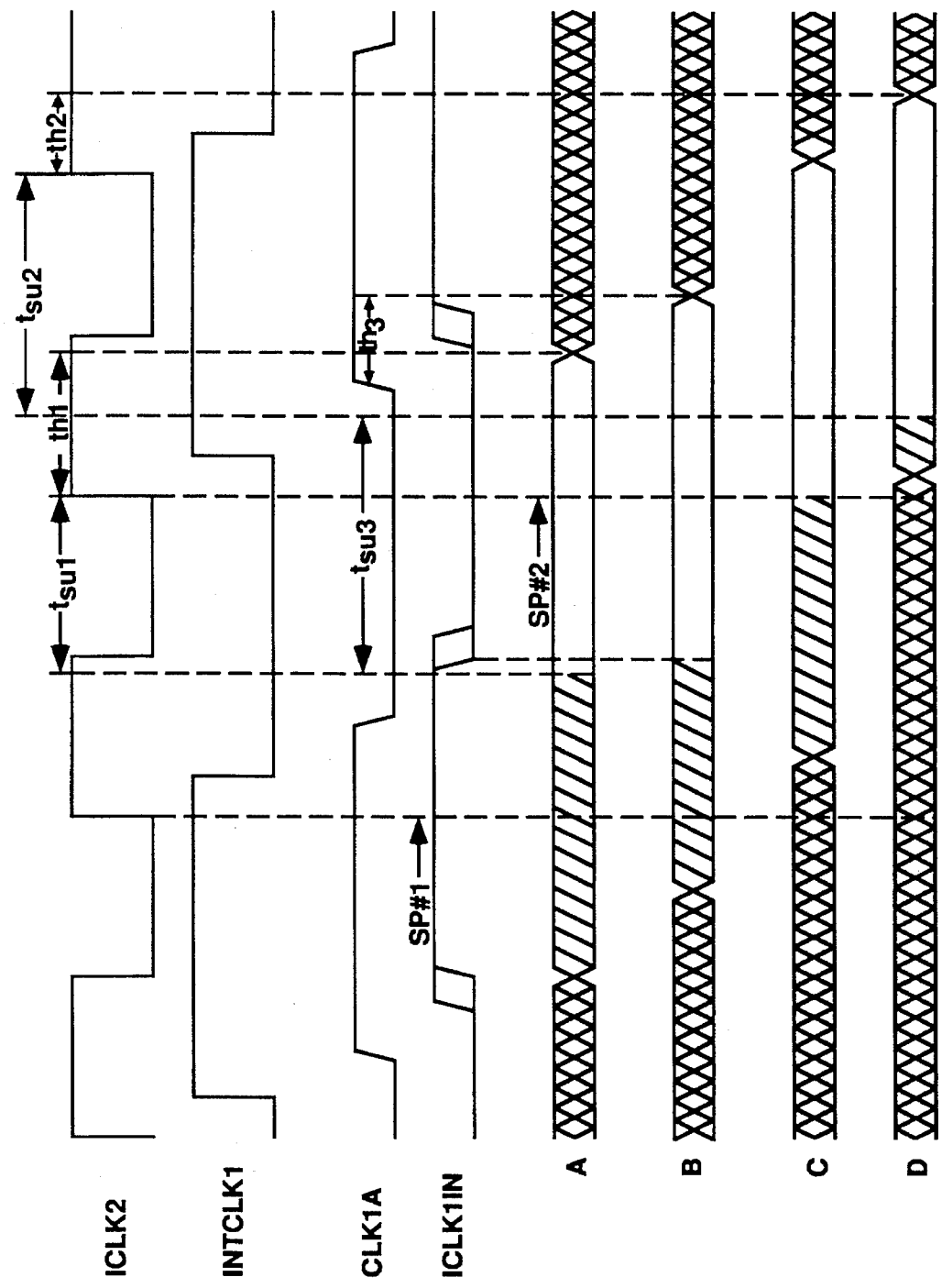
FIG. 4 is a timing diagram of the signals of FIG. 3.

FIG. 4 illustrates signal waveforms of the ICLK2 signal, the INTCLK1 signal, the CLK1A signal, the ICLK1IN signal, and group signals A through D. The ICLK2, INTCLK1, CLK1A, and ICLK1IN signals are the clock signals to and from DRAM controller 20 of FIG. 3. The A group signals represent the signals generated by either CPU 11 or system bus controller 12 (FIG. 3). The B group signals are the signals generated by either CPU interface 51 (FIG. 3) or system bus interface 52 (FIG. 3). The C group signals indicate the minimum to maximum delays on the $\overline{CAS}$ signals that DRAM controller 20 (FIGS. 2–3) generates. The D group signals represent the signals generated by main DRAM controller logic 46 of FIG. 3 to either CPU interface 51 or system bus interface 52.

Referring now to FIGS. 3–4, we now assume that CPU 11 is requesting a memory access operation. When this occurs, all the signals from CPU 11 that are used to decode DRAM accesses (i.e., Group A signals) are sampled by the rising edge of the ICLK2 clock signal, qualified by the logical low INTCLK1 signal (see sample point SP #2). This guarantees the set-up time period (i.e., $t_{su1}$) and the hold time period (i.e., $th_2$) for the signals generated from CPU 11, relative to the next rising edge of the ICLK2 signal.

All the signals generated by main DRAM controller logic 46 to either CPU interface 51 or system bus interface 52 (i.e., the D group signals) are asserted upon the rising edge of the ICLK2 signal, qualified by the logical high INTCLK1 signal (see sample point SP #1). This guarantees the set-up time period (i.e., $t_{su2}$) and the hold time period (i.e., $th_2$) for the signals generated from main DRAM controller logic 46 to either CPU interface 51 or system bus interface 52, relative to the next rising edge of the ICLK1IN signal.

All the B group signals generated by either CPU interface 51 or system bus interface 52 to their respective CPU 11 or system bus controlled 12 are generated from the rising edge of the ICLK1IN signal, independent of the ICLK2 signal. This guarantees the set-up time period (i.e., $t_{su3}$) and the hold time period (i.e., $th_3$) to be relative to the rising edge of the CLK1A signal. By causing both CPU interface 51 and system bus interface 52 to operate at the fed back CLK1IN signal, clock skew introduced by trace length and capacitive loading is minimized.

As also can be seen from FIG. 3, the CLK1A signal and the $\overline{CAS}$ signal are both outputted from the same component (I.e., DRAM controller 20). The minimum and maximum delays of the $\overline{CAS}$ signals will track the variation of the CLK1A signal due to the process, temperature, and power supply voltage variations.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A clock generation and distribution system for a memory controller in a computer system including a microprocessor coupled to the memory controller, wherein the memory controller includes a CPU interface circuit that interfaces with the microprocessor and a main memory controller circuit coupled to a memory for controlling memory operations of the memory, wherein the clock generation and distribution system comprises:

(A) a clock generation circuit for generating a first clock signal the frequency of which is controlled by that of an input clock signal from an external clock source wherein the first clock signal is (1) applied to the main memory controller circuit for controlling operation of the main memory controller circuit and (2) not applied to the CPU interface circuit;

(B) a delay circuit coupled to the clock generation circuit for delaying the first clock signal to be a delayed first clock signal, wherein the delay circuit has a controllable delay;

(C) an electrical connection circuit external to the memory controller and coupled to the delay circuit for transferring the delayed first clock signal to the microprocessor and the CPU interface circuit such that the CPU interface circuit is synchronized with the microprocessor, wherein the delayed first clock signal controls operation of the CPU interface circuit.

2. The clock generation and distribution system of claim 1, wherein the electrical connection circuit introduces a signal transfer delay to the delayed first clock signal, wherein the delay circuit controls the controllable delay such that the delayed first clock signal with the signal transfer delay is synchronized with the input clock signal.

3. The clock generation and distribution system of claim 1, wherein the delay circuit is a phase locked loop circuit.

4. The clock generation and distribution system of claim 3, wherein the delay circuit receives the delayed first clock signal with the signal transfer delay via the electrical connection circuit to control the controllable delay.

5. The clock generation and distribution system of claim 1, wherein the input clock signal has a first frequency, wherein the first clock signal has a second frequency which is one half of the first frequency of the input clock signal.

6. The clock generation and distribution system of claim 1, further comprising a circuit for coupling the input clock signal to the main memory controller circuit such that the first clock signal can be synchronized with the input clock signal in the main memory controller circuit.

7. The clock generation and distribution system of claim 1, wherein the electrical connection circuit further comprises at least one signal transmission line.

8. An improved memory controller in a computer system having a microprocessor and a bus controller coupled to the memory controller, comprising:
  (A) a CPU interface circuit for interfacing with the microprocessor;
  (B) a bus controller interface circuit for interfacing with the bus controller;
  (C) a main memory controller circuit coupled to a memory for controlling memory operations of the memory;
  (D) a clock generation and distribution system that comprises
    (i) a clock generation circuit coupled to receive an input clock signal from an external clock source for generating a first clock signal the frequency of which is controlled by that of the input clock signal, wherein the first clock signal is applied to the main memory controller circuit for controlling operation of the main memory controller circuit, but not to the CPU interface circuit and the bus controller interface circuit;
    (ii) a delay circuit coupled to the clock generation circuit for delaying the first clock signal to be a delayed first clock signal, wherein the delay circuit has a controllable delay, wherein the CPU interface circuit, the bus controller interface circuit, the main memory controller circuit, the clock generation circuit, and the delay circuit reside on a single substrate;
    (iii) an electrical connection circuit residing external to the memory controller and coupled to the delay circuit for transferring the delayed first clock signal to the (1) the microprocessor, (2) the bus controller, (3) the CPU interface circuit, and (4) the bus controller interface circuit such that the CPU interface circuit is synchronized with the microprocessor and the bus controller interface circuit is synchronized with the bus controller, wherein the electrical connection circuit introduces a signal transfer delay to the delayed first clock signal, wherein the delay circuit controls the controllable delay such that the delayed first clock signal with the signal transfer delay is synchronized with the input clock signal, wherein the delayed first clock signal controls operation of the CPU interface circuit and the bus controller interface circuit.

9. The memory controller of claim 8, wherein the clock generation circuit further comprises a clock input circuit coupled to the external clock source for receiving the input clock signal from the external clock source.

10. The memory controller of claim 8, wherein the delay circuit is a phase locked loop circuit.

11. The memory controller of claim 10, wherein the delay circuit receives the delayed first clock signal with the signal transfer delay via the electrical connection circuit to control the controllable delay.

12. The memory controller of claim 8, wherein the input clock signal has a first frequency, wherein the first clock signal has a second frequency which is one half of the first frequency of the input clock signal.

13. The memory controller of claim 8, further comprising a circuit for coupling the input clock signal to the main memory controller circuit such that the first clock signal can be synchronized with the input clock signal in the main memory controller circuit.

* * * * *